(12) United States Patent
Fleury et al.

(10) Patent No.: US 7,169,309 B2
(45) Date of Patent: Jan. 30, 2007

(54) POLYSACCHARIDES WITH OXIME OR AMINE FUNCTIONS WHICH ARE USED FOR WATER TREATMENT AND SLUDGE CONDITIONING

(75) Inventors: Etienne Fleury, Irigny (FR); Cécile Bonnet-Gonnet, Paris (FR); Yvette Pescher, Paris (FR)

(73) Assignee: Rhodia Chimie, Aubervilliers (FR)

( * ) Notice: Subject to any disclaimer, the term of this patent is extended or adjusted under 35 U.S.C. 154(b) by 285 days.

(21) Appl. No.: 10/481,658

(22) PCT Filed: Jun. 27, 2002

(86) PCT No.: PCT/FR02/02238

§ 371 (c)(1),
(2), (4) Date: Jun. 18, 2004

(87) PCT Pub. No.: WO03/002464

PCT Pub. Date: Jan. 9, 2003

(65) Prior Publication Data

US 2004/0217064 A1    Nov. 4, 2004

(30) Foreign Application Priority Data

Jun. 29, 2001   (FR) .................................. 01 08879

(51) Int. Cl.
    *C02F 1/62* (2006.01)
(52) U.S. Cl. ..................... 210/730; 210/912; 210/913; 210/914; 536/55.1; 536/114
(58) Field of Classification Search ................. 210/730
    See application file for complete search history.

(56) References Cited

U.S. PATENT DOCUMENTS

| | | | | | |
|---|---|---|---|---|---|
| 3,912,715 | A |  | 10/1975 | Jarowenko | 260/233 |
| 4,565,635 | A | * | 1/1986 | Le Du et al. | 210/727 |
| 5,738,795 | A | * | 4/1998 | Chen | 210/730 |
| 6,139,751 | A | * | 10/2000 | Bogaert et al. | 210/679 |
| 6,846,923 | B2 | * | 1/2005 | Wang et al. | 536/55.1 |
| 6,987,181 | B2 | * | 1/2006 | Jaschinski et al. | 536/56 |

FOREIGN PATENT DOCUMENTS

| | | |
|---|---|---|
| JP | 10113677 | 5/1998 |
| WO | WO 98 21271 | 5/1998 |

OTHER PUBLICATIONS

Patent Abstracts of Japan, vol. 1998, No. 10, Aug. 31, 1998, & JP 10 113677A (Sakai Kokichi; Onaka Takashi; Manabe Koji), May 6, 1998 abstract.
International Search Report.

* cited by examiner

*Primary Examiner*—Peter A. Hruskoci

(57) ABSTRACT

The invention relates to a particular polymer which is derived from a copolymer polysaccharide formed by a main chain comprising similar or different anhydrohexose units and branches including at least one neutral or anionic anhydropentose and/or anhydrohexose unit. Moreover, the invention relates to the use of said polymer in the treatment of aqueous media, in particular the treatment of aqueous effluents containing heavy metals, the treatment of waste water, drinking water and for sludge conditioning. Said derivative polymer comprises one or more units bearing an oxime function at least at position C2.

24 Claims, No Drawings

POLYSACCHARIDES WITH OXIME OR AMINE FUNCTIONS WHICH ARE USED FOR WATER TREATMENT AND SLUDGE CONDITIONING

This application is an application under 35 U.S.C. Section 371 of International Application No. PCT/PCT/FR02/02238 filed on Jun. 27, 2002.

The present invention relates to the use, for treating aqueous media, in particular for treating aqueous effluents containing heavy metals, for treating waste water or drinking water, or for conditioning sludges, of a polymer which is derived from a polysaccharide which carries lateral sugars and carries at least an oxime function in the C2 position or of a polymer which comprises at least an amine function in the C2 position, with this polymer being obtained from the preceding polymer.

One the one hand, the polysaccharides which are encountered comprise for the most part chains of various sugars which are linked to each other and which, in addition to the primary alcohol functions or, possibly, aldehyde or ketone functions, mainly exhibit secondary alcohol functions.

One of the rare polysaccharides to differ in this regard is chitosan. This polysaccharide is obtained by deacetylating chitin, which is a structural polymer in the exoskeletons of arthropods, the endoskeletons of cephalopods or else the cell walls of some fungi or algae. It consists of repeated D-glucosamine units which are linked β-(1->4), containing up to 40% N-acetylglucosamine residues. In the case of the lowest contents of acetylated residues, the intrinsic pK of the amine function in protonated form is very low (approximately 6.5) as compared with the other polyamines; chitosan possesses, in particular, metal-chelating capacities which are not possessed by the other polysaccharides.

However, one of the major drawbacks of chitosan is the cost of this product.

The high cost of chitosan is due to the fact that chitin, which is the product from which it is derived, originates from the carapaces of marine animals such as crabs, krill, the squid endoskeleton, etc. Steps of preliminary treatment therefore have to be carried out in order to extract the chitin. In addition, the volumes of chitin which are available are limited simply due to the origin of this product.

A further constraint is that of the chemical treatments which are required for obtaining the chitosan. Thus, the deacetylation is most frequently effected using 40–50% sodium hydroxide solution. Furthermore, these chemical treatments can prove to be polluting and therefore make it necessary to implement processes for treating the effluents, thereby increasing still further the cost of the final product.

On the other hand, it is known to use various agents during the treatment of (urban or industrial) waste water and during the treatment of, in particular when obtaining, drinking water. Ferrous or ferric chloride, ferrous or ferric sulfate, ferric chlorosulfate and aluminum chloride may thus be mentioned. It is also possible to use aluminum polychlorides or aluminum polychlorosulfates.

In addition, the water used for washing (or purifying) the smoke from factories for incinerating household refuse or industrial waste constitutes a medium containing heavy metals, which heavy metals then have to be removed.

Finally, the treatment of urban or industrial sewage, in particular by the biological route, leads to the formation of sludges. These sludges are generally subjected to a mechanical dehydration procedure (in particular filtration (for example filter press or band filter) or centrifugation) before being transported to a dumping site or a site for agricultural spreading or incineration. The sludges to be treated mainly consist of water in which biomass is dispersed. The treatments are therefore directed toward concentrating the dry matter to the greatest possible degree and removing water.

The aim of the present invention is therefore to propose using novel modified polysaccharides, which advantageously do not exhibit the abovementioned drawbacks of chitosan, for treating aqueous media, in particular aqueous, for example industrial, effluents, in particular those loaded with heavy metals, waste water or drinking water, or for conditioning sludges.

These aims, and others, are achieved by the present invention, which relates, in the first place, to the case, for the treatment of aqueous media or for sludge conditioning, of at least one polymer which is derived from a copolymeric polysaccharide which is formed from a main chain which comprises similar or different anhydrohexose units and branches which comprise at least one neutral or anionic anhydropentose and/or anhydrohexose unit, with said derived polymer comprising one or more units which carry(ies) an oxime function at least in the C2 position and being capable of being obtained by implementing the following steps:

a) bringing a polysaccharide into contact with an aqueous solution which comprises at least one oxidizing agent which enables at least the hydroxyl radical carried by the C2 carbon of one or more units to be oxidized to a ketone function;

b) bringing the resulting polymer into contact with hydroxylamine, or a derivative, in order to transform the ketone function into an oxime function.

In the second place, the present invention relates to the use, for the treatment of aqueous media or for sludge conditioning, of at least one polymer which is derived from a copolymeric polysaccharide which is formed from a main chain which comprises similar or different anhydrohexose units and branches which comprise at least one neutral or anionic anhydropentose and/or anhydrohexose unit, with said polymer comprising one or more units which carry(ies) an amine function at least in the C2 position and being capable of being obtained by implementing a step c) which consists in bringing the polymer possessing one or more units carrying an oxime function at least in the C2 position into contact with an agent which reduces the oxime function.

It has been observed that the novel polymers which are used in the invention are preferentially effective in treating waste water, which may possibly be loaded with heavy metals, and drinking water, and in removing the heavy metals which are present in aqueous effluents (in particular the polymers which possess the oxime functions), in particular in a relatively wide pH range, and also in conditioning sludges.

In the treatment of waste water or drinking water, these polymers can be employed either on their own or after using conventional iron and/or aluminum compounds.

When being used for treating waste water and drinking water, these novel polymers are generally effective in reducing the turbidity and the COD (chemical oxygen demand). Those possessing the oxime functions (first part of the subject-matter of the invention) are able, in contrast to those possessing the amine functions, to decrease the residual metal (aluminum, iron, etc.) content in the medium, when being used for treating drinking water, and, furthermore, remove the heavy metals, when being used for treating waste water which contains these metals; when being used for treating sludges, the polymers possessing the oxime functions are able, in contrast to those possessing the amine functions, to concentrate any possible heavy metals on the sludges to a greater extent.

Within the context of the invention, heavy metals are understood, in particular, as meaning metals having a valency greater than or equal to 2, preferably equal to 2, and, in particular, those selected from antimony, arsenic, bismuth, cadmium, chromium, cobalt, copper, tin, manganese, mercury, molybdenum, nickel, gold, lead, thallium, tungsten, zinc, iron and the metals of the actinide family. The heavy metals which are particularly aimed at are chromium, copper, nickel, iron, cadmium, mercury, lead and zinc. The heavy metals which are to be removed are usually present in the form of ions, in particular in the form of their respective cations.

The polymers which are used in accordance with a first part of the subject-matter of the invention are novel polymers which are derived from polysaccharides which are formed from a main chain comprising similar or different anhydrohexose units and branches comprising at least one neutral or anionic anhydropentose and/or anhydrohexose unit.

These polymers can be obtained from polysaccharides which are available in substantial and renewable quantities. This is because the polysaccharides which can be used for preparing the polymers according to the invention are derived from plants, such as cyanopsis tetragonoloba, and carob seed. Furthermore, the polysaccharides are extracted very simply from these sources and do not require any specific chemical transformation.

It is to be noted that, according to the invention, the term copolymeric polysaccharide signifies that the polymer is not selected from those in which all the constituent units are identical. In that which follows, and unless otherwise indicated, the term "polysaccharide" will be used instead of copolymeric polysaccharide.

The (similar or different) hexose units of the main chain of the native skeleton of the polysaccharide can, in particular, be units which are selected from D-glucose, D- or L-galactose, D-mannose, D- or L-fucose, L-rhamnose, etc.

The (similar or different) neutral or anionic pentose and/or hexose units of the branches of the native skeleton of the polysaccharide can, more specifically, be units which are selected from D-xylose, L- or D-arabinose, D-glucose, D- or L-galactose, D-mannose, D- or L-fucose, L-rhamnose, D-glucuronic acid, D-galacturonic acid and D-mannuronic acid, among others.

Furthermore, the polysaccharides from which the polymers used in the invention are obtained can be used in the native state or else after having undergone one or more depolymerization processes.

The galactomannans, the galactoglucomannans, the xyloglucans, the succinoglycans, the rhamsans and the welan gums, inter alia, may be mentioned as examples of native polysaccharide skeletons.

The native skeleton of the polysaccharide from which the polymer used according to the invention is derived is preferably a galactomannan.

The galactomannans are macromolecules which are composed of a main chain of D-mannopyranose units, linked in the β(1–4) position, which is substituted by D-galactopyranose units in the α(1–6) position.

They are extracted from the albumen of leguminous seeds, of which they constitute the reserve carbohydrate. Preferred galactomannans which may be mentioned are guar gum, which is derived from guar seeds (*Cyanopsis tet-ragonoloba*), carob gum, with this being extracted from the seeds of the carob tree (*Ceratonia siliqua*), tara gum and cassia gum.

Quite preferably, the native skeleton is a guar gum. More specifically, the guar gums exhibit a mannose/galactose ratio of 2.

The weight average molar mass of the polysaccharides which can be used for obtaining the polymers used according to the invention can vary over a wide range. However, said polysaccharides advantageously exhibit a weight average molar mass of between $10^4$ and $3.10^6$ g/mol (determined by size exclusion chromatography).

The polysaccharides can be used in the form of a powder or of particles of a few millimeters in size. It is to be noted that, in the case of galactomannans such as, in particular, guar, said particles are termed splits and consist of the seed cotyledons, which have been separated from the central germ and the envelope. These splits can also contain water. The content of water depends to some degree on the humidity of the ambient air. However, by way of illustration, the content of water is generally less than or equal to 10% by dry weight.

The polymers used in the invention therefore comprise one or more units which are carrying an oxime function at least in the C2 position in the unit. The other positions in the unit, in addition to the carbon in the C2 position, which are capable of carrying such a function are, possibly, the C3 carbon atoms and, possibly, the C4 carbon atoms. It is to be noted that, depending on the nature of the unit and its position in the polymer chain (main chain or branch), it may not be possible to oxidize the carbon in this position. In addition, it is pointed out that the polymers according to the invention may comprise units which do not carry any oxime function. Furthermore, the polymer used can, where appropriate, carry a carboxylic acid function (—COOH) in the C6 position in one or more units.

When the polymer used according to the invention is composed of different types of oxidized carbon atoms (C2 and C3, C4 or C6), said atoms may or may not be located in the same unit.

It is recalled that the C2 carbon is located in the α position to the anomeric carbon.

According to one particularly advantageous embodiment of the present invention, the polymers are such that the majority (more than 50% by number) of the oxime functions are carried by the carbon atoms in the C2 position.

A preferred variant of the invention consists of the use of a polymer which is obtained from native or non-native (more specifically depolymerized) guar and which carries an oxime function which is mainly in the C2 position, with the majority of the substituted units being those which constitute the branches of the guar.

The first step in the process which can be used for preparing the polymers used according to the invention will be described first of all. Step a) consists in bringing the native or non-native polysaccharide into contact with an aqueous solution which comprises at least one oxidizing agent which enables at least the hydroxyl radical carried by the C2 carbon in one or more units to be oxidized to a ketone function.

A first embodiment of step a) consists in using the polysaccharide in the form of an aqueous solution.

According to this embodiment, step a) is carried out in a homogeneous phase.

A second embodiment of step a) consists in using the polysaccharide in the form of a powder or of particles in the presence of an organic compound which is selected from the solvents which do not dissolve the polysaccharide (nonsolvents). Under these conditions, the preparation process is implemented in a heterogeneous form.

Said organic compound is selected from the compounds which are inert under the conditions of the reaction. Furthermore, said compounds are preferably selected from the compounds which are at least partially miscible with water. Examples of these compounds which may be mentioned are, inter alia, hindered or unhindered alcohols, such as, very particularly, methanol, ethanol, isopropanol or tert-butanol; and ketones, such as acetone.

Within the context of the second embodiment of step a), the reaction can be carried out in the presence of water. However, the quantity of water which is involved during this step is such that the polysaccharide remains in the form of powder or particles which is/are dispersed in the reaction mixture. Thus, if step a) takes place in the presence of water, the content of the latter preferably does not in general exceed 30% by weight of the reaction mixture.

With regard to the nature of the oxidizing agent or the latter is advantageously selected from bromine or the periodate of an alkali metal such as sodium. The oxidizing agent employed is preferably bromine.

It is to be noted that the oxidizing agent is used in the form of an aqueous solution. The quantity of water supplied with the oxidizing agent is such that the reaction is still carried out in heterogeneous phase. Thus, the content of water supplied together with the oxidizing agent is preferably such that the maximum content of water in the reaction mixture is less than or equal to 30% by weight of the reaction mixture.

In certain cases, in particular that in which step a) is carried out using periodate, it can be advantageous to recycle this oxidizing agent in the usual manner.

Furthermore, the molar ratio (oxidizing agent)/(functions to be oxidized) is more specifically less than 6, more particularly less than 4 and preferably between 1 and 2.5.

According to one advantageous embodiment, step a) is carried out by adding the oxidizing agent to the polysaccharide.

In addition, a particularly appropriate variant of the invention consists in maintaining the pH during step a). The pH of the aqueous solution is preferably maintained at a value between 6 and 8, very advantageously at a pH between 6.5 and 7.5.

The pH can be maintained by adding a base. It is to be noted that the base can either be added directly to the reaction mixture or added to the solution of the oxidizing agent.

The temperature at which step a) is carried out is preferably between 0 and 70° C., advantageously between 10 and 30° C.

The skilled person can set the duration of step a) without difficulty using standard analytical methods ($^{13}$C NMR, infrared). As a simple illustration, and in the case of reaction conducted discontinuously and in homogeneous phase, the duration of step a) is less than 60 minutes, more specifically less than or equal to 30 minutes, and preferably between 10 and 25 minutes. It is pointed out that this length of time does not include that of introducing the oxidizing agent.

Attention is drawn to the fact that the polymer derived from step a) can exhibit a carboxylic function on one or more of the repeated units of the initial polysaccharide. Such a function can be obtained by oxidizing the primary alcohol function if it is present in the unit under consideration.

Furthermore, having been selectively oxidized during step a), the C2 carbon atom and, where appropriate, the C3 or C4 carbon atoms can be present in two different forms, with the one being in equilibrium with the other. Thus, the ketone form can be present in equilibrium with the hydrated ketone form ($^{HO}$>C<$^{OH}$)

At the conclusion of step a), which has just been described, the resulting polymer is such that it exhibits an average degree of substitution of the secondary hydroxyl functions, more specifically carried by the C2 carbon and, where appropriate, by the C3 or C4 carbon atoms, of between 0.01 and 2, preferably of between 0.1 and 1.

It is pointed out that the average degree of substitution is calculated from carbon 13 NMR spectra and, more specifically, from the integrals of the unresolved peaks which are characteristic of the functions which are present in the resulting polysaccharide.

Its value is given by the following calculation:

$$DS = \frac{(I \times 100)}{(Ic_{total})} \times \frac{DS_{max}}{(100 \: C\alpha/C\beta)}$$

in which:

I denotes the integral of the unresolved peak under consideration;

$Ic_{total}$ denotes the integral of all the unresolved peaks;

$DS_{max}$ denotes the maximum degree of substitution; it is 2 in the case of the ketone functions;

Cα denotes the number of carbons which can be modified per repeated unit (example: galactose; mannose: Cα=4); and Cβ denotes the average total number of carbons per repeated unit (example: galactose; mannose: Cβ=6).

At the conclusion of this step a), the resulting polymer is preferably separated from the reaction medium.

When the reaction has taken place in homogeneous medium, the separation can be effected by adding a nonsolvent of the resulting polymer to the reaction medium. The nonsolvents mentioned within the context of the variant relating to the reaction in heterogeneous phase are suitable and it is possible, therefore, to refer to them.

The polymer is then separated by filtration or centrifugation.

When the reaction is carried out in heterogeneous medium, this separation is effected by simple filtration or centrifugation.

As has previously been mentioned, step b) consists in bringing the resulting polymer into contact with hydroxylamine, or a derivative, in order to transform the ketone function into an oxime function.

It is to be noted that, if a hydroxylamine derivative is used, it is selected from hydroxylamine sulfate and hydroxylamine chloride.

When step b) is carried out in the presence of a hydroxylamine derivative it is then preferable to carry out said step while maintaining the pH between 6 and 9.5. This can be effected, in particular, by adding a base during the course of this step.

According to an advantageous embodiment of this step b), the molar ratio (hydroxylamine or derivative)/(ketone functions to be transformed) is between 1 and 10, preferably between 1 and 6.

In general, step b) is carried out using an aqueous solution of the hydroxylamine or hydroxylamine derivative.

Advantageously, the hydroxylamine or its derivative is employed in this step in the form of an aqueous solution in which the concentration of the hydroxylamine or derivative is between 20 and 60% by weight.

The temperature at which step d) is carried out is more specifically between 0 and 70° C., preferably between 10 and 30° C.

At the conclusion of this step b), the resulting polymer exhibits an average degree of substitution of the ketone functions of less than 2, preferably of between 0.01 and 2 excluded.

The average degree of substitution is once again determined from carbon 13 NMR spectra and, more specifically from the integrals of the unresolved peaks which are characteristic of the functions which are present in the resulting polysaccharide.

Its value is given by the following calculation:

$$DS = \frac{(I \times 100)}{(IC_{total})} \times \frac{DS_{max}}{(100\ C\alpha/C\beta)}$$

in which:

I denotes the integral of the unresolved peak under consideration;

$IC_{total}$ denotes the integral of all the unresolved peeks;

$DS_{max}$ denotes the maximum degree of transformation; it is 2 in the case of the oxime functions;

Cα denotes the number of carbon atoms which can be modified per repeated unit (example: galactose; mannose: Cα=4); and Cβ denotes the average total number of carbons per repeated unit (example: galactose; mannose: Cβ=6).

Once again, it can be preferable to separate the resulting polymer from the reaction medium. This procedure can, in particular, take place in the same way as in the case of step a).

The present invention also relates to the use, for the treatment of aqueous media or for sludge conditioning, of a novel polymer which is derived from a polysaccharide which is formed from a main chain comprising similar or different anhydrohexose units and from branches comprising at least one neutral or anionic anhydropentose and/or anhydrohexose unit, with said polymer comprising one or more units which carry an amine function at least in the C2 position and being capable of being obtained by implementing a step c) which consists in bringing the polymer possessing one or more units carrying an oxime function at least in the C2 position into contact with an agent which reduces the oxime function.

The polymers thus used according to the invention therefore comprise one or more units which carry an amine function in the C2 position in the unit, and, where appropriate, on the C3 carbon atoms and, where appropriate, on the C4 carbon atoms. In addition, it is pointed out that said polymers can comprise units which do not carry any oxime function. Furthermore, these polymers can, where appropriate, carry a carboxylic acid function (—COOH) in the C6 position in one or more units.

Finally, when the polymer used according to the invention comprises different types of carbon atom carrying an oxime function (C2 and C3 or C4), said atoms may or may not be located in the same unit.

The reaction which is brought into play for obtaining the polymer comprising one or more amine functions can take place by using, as the agent for reducing the oxime function to an amine function, an agent which is selected from lithium hydride and aluminum hydride; and boron compounds such as $BH_3$, $NaBH_4$, $NaBH_3CN$ and $NaBH_2S_3$, which may or may not be combined with a Lewis acid. Lewis acids which can be used, preferably in combination with borohydride or cyanoborohydride, and which may be mentioned are molybdenum oxide, nickel chloride, titanium chloride and titanium oxide.

This type of agent is customarily, and advantageously, used in the presence of water, with the exception of lithium aluminum hydride which is preferably used in the presence of a solvent of the tetrahydrofuran type.

The temperature can vary over a wide range. As an indication, it is between 10° C. and the temperature at which the medium refluxes.

It is also possible to use hydrogen in the presence of a catalyst of the palladium on carbon type, where appropriate in the presence of hydrochloric acid, or of the platinum oxide type or Raney nickel type.

The pH at which the reaction is carried out can vary over a relatively extended range, depending on the nature of the reducing agent which is selected. Thus, as an example, and in the specific case of a reduction carried out using a borohydride, the pH is advantageously between 3 and 10.

Finally, this step c) is preferably carried out under an inert atmosphere. Thus, nitrogen or rare gases can be used in the appropriate manner.

In general, the quantities of novel polymers employed in accordance with the invention correspond to those used in the case of the products which are customarily employed in the treatments concerned.

Examples which are specific, but which do not limit the invention, will now be presented.

EXAMPLES

In the examples which follow:

1/the weight average molar masses of the polymers carrying ketone or oxime functions are determined as follows:

The measurement is carried out in: Millipore 18 MΩ water, 30% MeOH, 0.1 M LiCl, pH 9–10 (2/10000 parts of $NH_4OH$).

The features of the equipment are as follows:

Chromatographic columns: 1 Shodex SB806HQ 30 cm, 5 μm column+1 Asahi GFA30 60 cm, 5 μm column.

Injection pump: Wisp 717+Waters 515 pump

Detector: Waters 410 RI refractometer, sensitivity 8, Wyatt MALLS light scattering, He 633 nm laser Flow rate: 0.5 ml/mn The injected solution (200 μl) contains 1/1000 by weight of polysaccharide.

The weight average molecular mass is established directly without calibration using the light scattering values extrapolated to zero angle; these values are proportional to C×M×(dn/dc)2.

C corresponds to the concentration of polysaccharide

M corresponds to the weight average molecular mass n corresponds to the refractive index of the solution c corresponds to the concentration of polysaccharide the ratio dn/dc is in this present case equal to 0.15.

2/nitrogen is determined using a Carlo Erba EA1108 analyzer, which analyzes C, H, N and S simultaneously in organic substances using the classical methods of Dumas and Pregl.

The analyzer comprises 2 essential parts having very distinct functions:

1. A reactor, which consists of a quartz column having tiered filling. This is the site of the successive transformations of the samples (combustion, oxidation and reduction) in order to extract the sought-after elements C, H, N and S in the form $N_2$, $CO_2$, $H_2O$ and $SO_2$.
2. An analytical cell, which consists of a gas chromatography column and catharometric detection.

The processing of the data is managed entirely by a microcomputer which is equipped with the Eager 200 software supplied by the manufacturer Carlo Erba.

With the content of nitrogen being expressed in percentage by weight, the amine function DS is calculated using the following formula:

$DS=162.Y/(1400+15Y)$, where $Y$ is the percentage of nitrogen by weight.

This formula is obtained bearing in mind that the polymer has the following empirical formula:

$C_6H_{(10+DS)}O_{(5-DS)}N_{(DS)}$

EXAMPLE 1

Synthesizing a Polymer which is Derived from Guar and Carries Ketone Functions 54 grams of guar (weight average molar mass: 50000 g/mol—Meyprogat® 7, marketed by Rhodia) are dissolved in 840 ml of water.

In addition, a solution of bromine is prepared by adding 26 ml of bromine to 250 ml of water and then neutralizing by adding sodium hydroxide solution (2N) in order to obtain a stable pH of 7.6.

The bromine solution which is thus obtained (2 equivalents per anhydropyrannose motif) is then added dropwise to the polymer.

While the bromine is being added, and until the pH no longer changes, sodium hydroxide solution (2N) is added so as to maintain the pH at approximately 7.

When the pH has stabilized, the reaction mixture is poured into ethanol so as to precipitate the polymer which has been obtained. The polymer is then filtered on a no. 4 frit.

At the conclusion of this step, the polymer possesses ketone functions predominantly at positions C2 and C3.

For the analysis, the product is dried by lyophilization.

The $^{13}C$ NMR spectrum is analyzed.

Conditions: 400 MHz
  Solvent: $D_2O$
  Temperature 70° C.
  Accumulation time: approximately 48 hours.

Results:

Comparison of the spectrum of the starting polymer and of that derived from the reaction shows the appearance of three new unresolved peaks which are characteristic of the ketone, hydrated ketone and carboxylic acid functions.

In addition, the degree of ketone substitution, as calculated from the 13C NMR spectrum, is 0.53.

The weight average molar mass is 6500 g/mol.

EXAMPLE 2

Synthesizing the Polymer Comprising the Oxime Functions 40 g of the product in the solid and dry state, as previously obtained, are dissolved in 700 ml of water. The pH of the solution is approximately 7.

76 ml of a 50% by weight solution of hydroxylamine in water are added to the solution.

After addition, the pH is 9.4.

The whole is left to stir for 18 hours. The pH is 9.1.

At the conclusion of this step, the product is separated off by precipitation in ethanol and filtration on a no. 4 frit.

For the analysis, the product is dried by lyophilization.

Comparison of the $^{13}C$ NMR spectra (ambient temperature, 4 hours) of the polymers obtained during the oxidation step and after the oximation step shows the appearance of an unresolved peak which is characteristic of the oxime function.

Elemental analysis of the polymer (determining the nitrogen by thermally degrading the compound and then using gas chromatography to analyze the emitted gases) indicates that the transformation of the ketone functions is almost quantitative.

The calculated degree of substitution is 0.46.

The weight average molar mass is 5100 g/mol.

EXAMPLE 3

Synthesizing the Amine Derivative 8 ml of a 13% solution of $TiCl_3$ in 20% HCl, and 10 ml of water, are initially introduced into a stirred glass reactor.

2 g of NaOH which has been previously dissolved in 10 ml of water are then added. A violet precipitate is then formed.

10 ml of an aqueous solution containing 500 mg of $NaBH_4$ are then added to this mixture and, after stirring for 15 minutes, 1 g of guar oxime from the previous example, dissolved in 15 ml of water, is introduced.

The medium becomes white and very viscous; it is left to stir under nitrogen for 48 hours.

At the end of this period, the pH of the medium is 8.5.

The solid phase of the reaction medium is separated from the liquid phase by filtration and the modified guar, which is located in the liquid, is recovered by means of precipitation in a nonsolvent (ethanol) and filtration.

The polymer is analyzed by $^{13}C$ NMR.

Under these conditions, it is seen that the unresolved peak of the oxime at 154 ppm has disappeared.

In parallel, peaks appear at about 54 ppm, corresponding to carbon atoms which are carrying an amine function.

The $^1H$ NMR confirms this result since there are characteristic signals of the proton in the α position of an amine function between 1 and 2.5 ppm.

Finally, elemental analysis enables the nitrogen content to be measured. It is 4.1 as compared with 4.2 in the case of the oximated product.

EXAMPLE 4

The polymer obtained at the end of example 2, and also a cationic polyacrylamide marketed by the company SN FLOERGER under reference F04698, are subjected to a synthetic waste water clarification test.

a—Synthesis of the Waste Water:
The following are mixed in a 1 liter container:

| | |
|---|---|
| demineralized water | 0.5 l |
| bentonite (clay) | 3.2 g ± 0.1 g |
| sugar | 2.4 g ± 0.1 g |
| humic acid (Na) | 0.2 g ± 0.1 g |
| $CaCl_2$ | 5.1 g ± 0.1 g |
| $NH_4Cl$ | 4.0 g ± 0.1 g |
| $K_2HPO_4$ | 2.0 g ± 0.1 g |
| $NaHCO_3$ | 8.0 g ± 0.1 g |
| $Na_2S, 9H_2O$ | 308 mg ± 5 mg |

The mixture is then homogenized for 15 minutes using an ultrasonicator.

The suspension volume is made up to 1 liter using demineralized water.

The suspension is transferred into a 30 liter polyethylene tank.

4 liters of demineralized water are added using a 1 liter container, with this being followed by 3 cans, each of which contains 5 liters of demineralized water. Calcium-rich powdered milk (7.7 g±0.1 g) is then added to the suspension.

Finally, the latter is stirred for from 1.5 to 2 hours using a mechanical stirrer (300 rpm) fitted with a paddle having two retractable arms.

b—Clarification Test

A KEMIRA 208 flocculator, whose thermostated bath is set to a temperature of 17° C., is used.

The stirring times are regulated in accordance with the sequence of programmed operations in 6 different pots:

| | 1 | 2 | 3 | 4 | 5 | 6 |
|---|---|---|---|---|---|---|
| Rapid stirring | 60 s | 60 s | 60 s | 60 s | 60 s | 60 s |
| Slow stirring | 10 min | 10 min | 10 min | 10 min | 10 min | 10 min |
| Sedimentation | 15 min | 15 min | 15 min | 15 min | 15 min | 15 min |

In order to determine the product dose which leads to the optimum purification performance of said product, 1000 ml of synthetic waste water, to which the product has been added at 6 different doses, are introduced into the 6 pots.

The 6 stirrers are placed in the pots.

Each programmed operation is started consecutively about every 2 minutes.

Each stirrer is withdrawn as soon as the sedimentation begins in the corresponding pot.

At the end of the sedimentation, a siliconated polyethylene tube filled with water is used to aspirate 100 ml of clarified water in order to rinse said tube.

While keeping one of the ends of the tube in the supernatant solution, a sample of 250 ml of clarified water is then withdrawn.

0.04 mg of cationic polyacrylamide F04698, dissolved in water at the rate of 1 g/liter, is used per liter of waste water to be treated.

At the end of the treatment, a percentage reduction in the turbidity of 97.1% and a percentage reduction in the COD of 41.8% are obtained.

0.05 mg of the polymer obtained at the end of example 2, dissolved in water at the rate of 1 g/liter, is used per liter of waste water to be treated.

At the end of the treatment, a percentage reduction in the turbidity of 98.6% and a percentage reduction in the COD of 50.1%, and therefore percentage reductions, particularly in regard to the COD, which are definitely greater than those obtained with the control F04698, are obtained.

The invention claimed is:

1. A process for removing heavy metals from waste water or for reducing the turbidity and the chemical oxygen demand (COD) of waste water or drinking water, and producing clarified, comprising the step of stirring said waste water or drinking water with a copolymeric polysaccharide formed from a main chain comprising similar or different anhydrohexose units and branches which comprise at least one neutral or anionic anhydropentose and/or anhydrohexose unit; said copolymeric polysaccharide comprising one or more units which carry(ies) an oxime function at least in a C2 carbon position located in an α position to an anomeric carbon and being capable of being obtained by implementing the following steps:
   a) bringing a polysaccharide into contact with an aqueous solution which comprises at least one oxidizing agent which oxidizes at least a hydroxyl function carried by the C2 carbon of one or more units of the polysaccharide to a ketone function; and
   b) bringing the polysaccharide obtained in step a) into contact with hydroxylamine, in order to transform the ketone function into an oxime function.

2. The process as claimed in claim 1, wherein the oxime function is located the C2 carbon position, a C3 carbon position, and a C4 carbon position to the anomeric carbon.

3. The process as claimed in claim 1, wherein one or more of the units carry(ies) a carboxylic acid function (—COOH) located on a C6 carbon position to the anomeric carbon.

4. The process as claimed in claim 3, wherein the polysaccharide is a galactomannan.

5. The process as claimed in claim 4, wherein the galactomannan is guar, carob, tara or cassia gums.

6. The process as claimed in claim 1, wherein the polysaccharide is in the form of an aqueous solution.

7. The process as claimed in claim 6, wherein step a) is performed in homogeneous phase.

8. The process as claimed in claim 1, wherein the polysaccharide is in the form of a powder or particles.

9. The process as claimed in claim 8, wherein step a) is performed in heterogeneous phase.

10. The process as claimed in claim 1, wherein the oxidizing agent is a bromine or a periodate of an alkali metal.

11. The process as claimed in claim 1, wherein the oxidizing agent has a molar ratio relative to the functions hydroxyl, of less than 6.

12. The process as claimed in claim 11, wherein the molar ratio is between 1 and 2.5.

13. The process as claimed in claim 1, wherein step a) is performed by adding the oxidizing agent to the polysaccharide.

14. The process as claimed in claim 1, wherein step a) is performed while maintaining the pH of the aqueous solution at a value which is between 6 and 8.

15. The process as claimed in claim 1, wherein the pH is maintained at between 6 and 9.5 during step b).

16. The process as claimed in claim 1, wherein step b) is implemented in the presence of a molar ratio of hydroxylamine relative to the ketone functions present, of between 1 and 10.

17. The process as claimed in claim 1, wherein step b) is implemented using an aqueous solution of hydroxylamine.

18. The process as claimed in claim 1, wherein the polysaccharide resulting from step a) or the polysaccharide resulting from step b) is further separated from the reaction medium by being precipitated in a non-solvent of the polysaccharide.

19. A process for removing heavy metals from waste water or for reducing the turbidity and the chemical oxygen demand (COD) of waste water or drinking water, and producing clarified water comprising the step of stirring said waster water or drinking water with a copolymeric polysaccharide formed from a main chain which comprises similar or different anhydrohexose units and branches which comprise at least one neutral or anionic anhydropentose and/or anhydrohexose unit, said copolymeric polysaccharide comprising one or more units which carry(ies) an amine function at least in a C2 carbon position located in an α position to an anomeric carbon and being capable of being obtained by implementing step c) consisting in bringing the polymer possessing one or more units carrying an oxime function at least in the C2 carbon position, as defined in claim 1, into contact with an agent which reduces the oxime function.

20. The process as claimed in claim 19, wherein the amine function is located the C2 carbon position, a C3 carbon position, and a C4 carbon position to the anomeric carbon.

21. The process as claimed in claim 19, wherein one or more of the units carry(ies) a carboxylic acid function (—COOH) located on a C6 carbon position to the anomeric carbon.

22. The process as claimed in claim 19, wherein step c) is implemented in the presence of lithium aluminum hydride or of boron compounds, optionally combined with a Lewis acid which is molybdenum oxide, nickel chloride, titanium chloride or titanium oxide.

23. The process as claimed in claim 19, wherein step c) is implemented at a pH of between 3 and 10.

24. The process as claimed in claim 19, wherein step c) is implemented under an inert atmosphere.

* * * * *